L. P. SILVERMAN.
WATER HEATER.
APPLICATION FILED SEPT. 25, 1912.
1,055,363.
Patented Mar. 11, 1913.
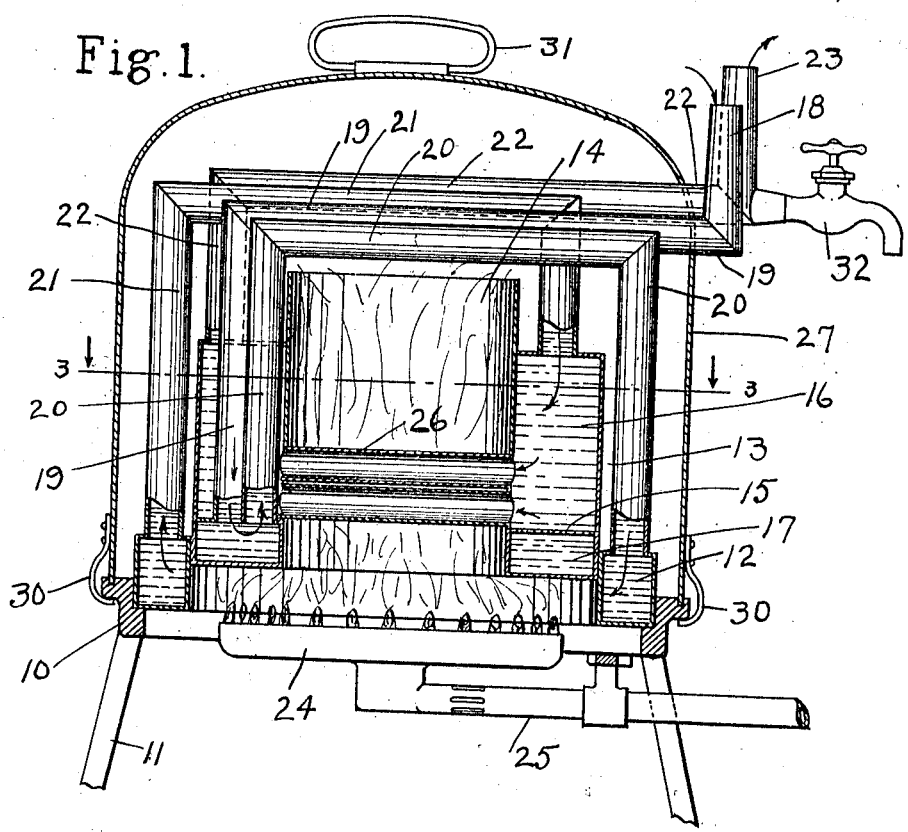
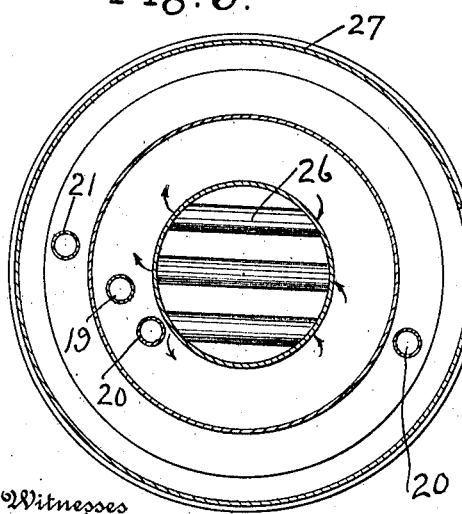
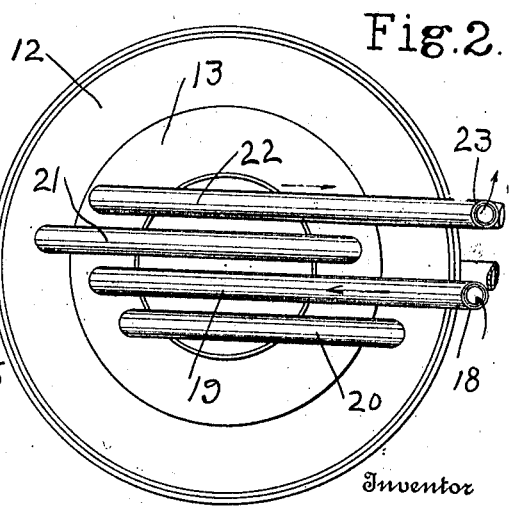
Inventor
Louis P. Silverman
By Howard E. Barlow
Attorney
Witnesses
W. W. Bardeley
E. I. Ogden

UNITED STATES PATENT OFFICE.

LOUIS P. SILVERMAN, OF PROVIDENCE, RHODE ISLAND.

WATER-HEATER.

1,055,363.   Specification of Letters Patent.   Patented Mar. 11, 1913.

Application filed September 25, 1912. Serial No. 722,301.

*To all whom it may concern:*

Be it known that I, LOUIS P. SILVERMAN, a citizen of the United States, and resident of the city of Providence, in the county of Providence and State of Rhode Island, have invented certain new and useful Improvements in Water-Heaters, of which the following is a specification.

This invention relates to water heaters, and has for its object to provide a small portable device of inexpensive construction primarily designed to be connected by a rubber tube or the like, to any ordinary water supply faucet and arranged to conduct and circulate this water a number of times around the heated zone and over the rising heat waves generated from beneath by a suitable gas burner, or other heat generator, to quickly and advantageously heat the water on its passage therethrough, and to finally discharge the heated water through a suitable pipe to any desired receptacle, such as a bowl or bath tub for bathing or other purposes.

An essential feature of my invention is the arrangement of water circulating conductors or pipes whereby in leading from one of the chambers or receptacles to another they are caused to pass through the conductors transversely across the path of the rising heat, by which construction the heat is advantageously applied to raise the temperature of the circulating water.

With these and other objects in view, the invention consists of certain novel features of construction, as will be more fully described and particularly pointed out in the appended claims.

Of the accompanying drawings: Figure 1— is a sectional elevation of my improved heater showing the water chambers arranged around the heat generator and the different pipes connecting the different chambers to cause the water to circulate a number of times therethrough before it is permitted to be discharged. Fig. 2— is a top view of the device with the outer casing removed. Fig. 3— is a plan view sectioned on line 3—3 of Fig. 1.

Referring to the drawing, 10 designates a frame or base standing on legs 11 for supporting the parts of the heater. Supported on this base is a comparatively narrow tubular ring 12 substantially rectangular in cross section. Located just inside of the upper edge of this ring 12 is a comparatively tall annular chamber 13 through the center portion of which is formed a large flue 14, the side walls of which flue form the inner walls of said annular chamber. This chamber 13 is divided by the partition 15 into an upper compartment 16 and a separate lower compartment 17. The diametrically opposite portions of the upper compartment of this body are connected by a plurality of transverse pipes 26 leading across the flue opening so that the heat in rising will act upon and quickly heat the water while circulating therethrough. Each of these three above-described water receptacles 12, 16 and 17 is separate and distinct from the others and the only communication from one to the other is through a set of pipes or conductors presently described.

The water which may be led from an ordinary water supply faucet through a pipe, such as rubber tubing, or the like, not shown, may be connected to the up-turned end 18 of the inlet pipe 19 the water passing through said pipe down into the lower compartment of the chamber 13. After circulating around through said compartment it passes upward through the tube 20 and transversely across the mouth of the open-ended flue 14, thence down into the lower outer ring 12. After circulating around through said ring 12 it passes upward through the pipe 21 again across the open end of the flue 14 and down into the upper compartment 16 of chamber 13, thence after circulating around the flue 14 it is permitted to pass out through pipe 22 to the end 23 to which may be connected any suitable pipe or tubing, to conduct the heated water to any desired receptacle, such as a bowl or bath tub.

The heat is preferably applied to this device by the burner 24 which is supplied with gas through the pipe 25, all of which is supported from the frame 10. The arrangement of the chambers or receptacles is such that the outer ring 12 projects down beyond the lower wall of compartment 17 forming a fire box around the heater so as to retain the heat to act first upon the surrounding water containing chambers and then to pass upward through the flue 14 around and between the cross circulating pipes 26 and the conductor pipes 19, 20, 21 and 22. In order to retain as much of this heat as possible about the water carrying members I have covered the whole with casing 27 suitably vented to permit the necessary draft for the burner and the same being slotted down its side at the points 28 and 29, see Fig. 3, so as to also permit the casing to pass readily over the protruding pipes 19 and 22. Small spring latches 30 are provided to hook over the frame work so that the whole may be secured together and so it may be readily carried about by means of the handle 31 when desired.

A faucet 32 is attached to the discharge pipe so that hot water may be drawn at the heater when desired.

I claim:

1. An improved water heater comprising a central heat conducting flue, an annular water chamber surrounding said flue and provided with a transverse partition dividing the same into upper and lower compartments, a heat generating device acting on the lower end of said chamber, an independent water ring surrounding said lower compartment and extending below the same to form a fire box, means for supplying water to said lower compartment, a water circulating conductor leading from said lower compartment to said water ring, a second conductor leading from said ring to said upper compartment, both of said conductors being extended transversely of the path of travel of the heat passing through said flue, and means for conducting the heated water from said upper compartment.

2. An improved water heater comprising a central heat conducting flue, an annular water chamber surrounding said flue and provided with a transverse partition dividing the same into upper and lower compartments, a heat generating device on the lower end of said chamber, an independent water ring surrounding said lower compartment and extending below the same to form a fire box, means for supplying water to said lower compartment, a water circulating conductor leading from said lower compartment to said water ring, a second conductor leading from said ring to said upper compartment, an inlet conductor leading to said lower compartment, and an outlet conductor leading from said upper compartment, all of said conductors being extended transversely of the path of travel of the heat passing through said flue.

3. An improved water heater comprising a central heat conducting flue, an annular water chamber surrounding said flue and provided with a transverse partition dividing the same into upper and lower compartments, a heat generating device acting on the lower end of said chamber, an independent water ring surrounding said lower compartment and extending below the same to form a fire box, means for supplying water to said lower compartment, a water circulating conductor leading from said lower compartment to said water ring, a second conductor leading from said ring to said upper compartment, both of said conductors being extended transversely of the path of travel of the heat passing through said flue, and means for conducting the heated water from said upper compartment, said upper compartment being provided with a cross circulating piece extending transversely through said flue.

In testimony whereof I affix my signature in presence of two witnesses.

LOUIS P. SILVERMAN.

Witnesses:
HOWARD E. BARLOW,
E. I. OGDEN.

---

Copies of this patent may be obtained for five cents each, by addressing the "Commissioner of Patents, Washington, D. C."